THREE STATE PARAMETRIC OSCILLATOR

Filed June 8, 1962

INVENTOR
WILLIAM E. FLANNERY

BY [signature]
ATTORNEY

United States Patent Office 3,421,016
Patented Jan. 7, 1969

3,421,016

THREE STATE PARAMETRIC OSCILLATOR

William E. Flannery, Norristown, Pa., assignor to Sperry Rand Corporation, New York, N.Y., a corporation of Delaware Filed June 8, 1962, Ser. No. 201,169
U.S. Cl. 307—88 9 Claims
Int. Cl. H03f *9/00*

This invention relates to information handling devices, and more particularly to circuits having more than one stable state of operation.

In the electronic data processing field, numerous multistable state devices are utilized for such purposes as storing information, counting, and the like. A bistable device, for example can store a "one" when it is in one of its stable states, and a "zero" when it is in its other stable state.

Parametric oscillators have, in the past, been used as bistable devices. In general, a parametric oscillator is a circuit or device having a reactance which is periodically varied so that oscillation occurs.

Parametric excitation can be defined as the achievement of power gain at one or more signal frequencies by means of a frequency transformation between one or more pump frequencies and the signal frequencies through the action of a medium with time varying characteristics.

By way of example, the oscillations may be sustained at a frequency one-half that of the pump signal frequency. Assume that the parameters of a tank circuit are adjusted in known fashion so that the natural or resonance frequency $f_o$ lies close to one-half the pump frequency $f_p$. When the amplitude of the pump signal exceeds a critical value, the tank circuit is driven into parametric oscillation at a frequency $f_{osc}=f_p/2$, which is nearly equal to $f_o$ because of the action of the pump signal on the variable reactance element. Two possible stable phase outputs may be obtained from the oscillator. These outputs are of equal amplitude but differ in phase by 180°. Which output is obtained will be determined by conditions existing in the tank circuit at the time oscillations commence. The circuit can be steered into one phase or the other by applying to the circuit a small signal of frequency $f_p/2$ during the time oscillations are starting to build up. This signal is commonly referred to as a "locking signal." The oscillations lock in at that one of the possible stable phases which is closest to the phase of the locking signal.

The prior art of parametric oscillators includes a device known as the "parametron." The parametron includes a pair of cores in which a pump source having a D.C. bias and an alternating current at frequency $f_p$ is coupled thereto by means of pump windings. Output windings of the cores are connected in an opposing manner to cancel induced voltages at the pump frequency. A capacitor is coupled across the output windings of desired value so that the output circuit is tuned to $f_p/2$. Such a circuit oscillates in either of two stable phases as described heretofore. Usually, the pump source is clocked so that it is alternately turned on and off. When the pump source is off, the circuit does not oscillate.

It is desirable in information handling systems that the systems operate at high speeds and that the circuitry be reliable, inexpensive and easy to manufacture. It is also desirable that the circuits be miniaturized so that the overall size and weight of a system be kept to a minimum. It is further desirable that the pump source be continually present to eliminate the expensive circuitry usually necessary for controlling the pump source. The present invention provides a circuit having more than one stable state and having a thin magnetic film as its principal component. The thin film oscillator of the type described herein is capabe of operation at extremely high frequencies, and, hence, at very high speeds.

It is an object of this invention to provide an improved multistable state circuit.

It is another object of this invention to provide a novel three-state oscillator.

It is a further object of this invention to provide a novel parametrically excited amplifier.

Yet another object of this invention is to provide a novel thin magnetic film oscillator which can be turned on and off by control pulses.

Still another object of this invention is to provide a novel oscillator which can oscillate in either of two different stable phases and which can be turned on or off by control pulses.

According to one embodiment of the present invention, an anisotropic thin magnetic film has a pump winding, a control winding and an output winding coupled thereto. A pump source, which provides a current having a D.C. bias component and an alternating current component superimposed thereon at frequency $f_p$, is continuously applied to the pump winding, the pump winding being oriented to produce magnetic fields along the hard axis of the film. The output winding has a capacitor across its terminals so that the "natural" frequency of the output circuit, when tuned, is the frequency $f_o=f_p/2$, the output winding being coupled to the film so that its axis lies in the easy axis of the film. A control circuit, which provides control pulses, is coupled to the control winding whose axis lies at a substantial angle with respect to the hard axis of the film.

The novel features of this invention and other objects and advantages thereof, together with its organization and method of operation, will become more apparent from the following description, when read in connection with the accompanying drawings, in which.

Figure 1:
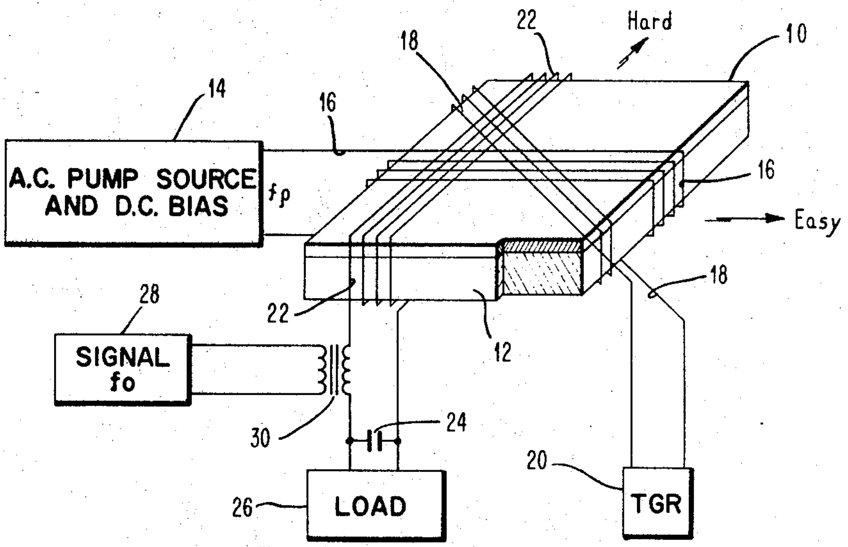
FIG. 1 is a block diagram, partly in cross-section, of one embodiment of this invention.

Referring to FIG. 1, there is shown an anisotropic thin magnetic film 10 deposited upon a suitable substrate 12. These magnetic films can be produced by various methods including electrodeposition and vacuum deposition. Anisotropic magnetic films can be produced by depositing a ferro-magnetic alloy onto the substrate in the presence of a magnetic field. The film then posseses an easy magnetic axis in one direction, and remains in that aligned direction in a stable state. By applying a suitable magnetic field, the film can reverse its stable state by 180°. Such films, which have but two stable states are termed anisotropic films. When such a film is temporarily placed in a magnetic field that is not in alignment with its preferred direction of magnetization (known as the "easy" direction), instability occurs, and, upon removal of the field, the film reverts back to one of its two stable states.

Figure 3:
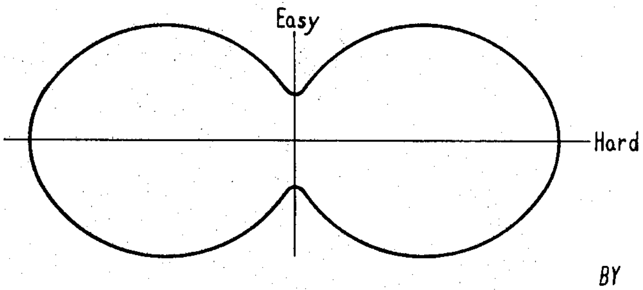
FIG. 3 is an energy diagram of a typical anisotropic thin magnetic film.

FIG. 3 illustrates the energy diagram of a typical anisotropic thin film. The energy (as measured from the origin) required to align the film in the hard direction is substantially greater than the energy existing in the easy direction. When an anisotropic film has a magnetic field of sufficient magnitude applied thereto along its hard axis, the magnetization is brought into alignment with the applied field and, now, if the applied magnetic field is quickly reduced to zero, the magnetization of the film now exists in an unstable state. The magnetization can return to the easy magnetic axis by two ways: coherent fall-back or non-coherent fall-back. Coherent fall-back occurs when the magnetization rotates uniformly from the hard axis to the easy axis. In the process of non-coherent fall-back, no uniform rotation of the magnetization occurs, but is believed to reverse by other means. Experimentally, it has been found that when a film has a magnetic field applied thereto in its hard direction, upon removal of the field the film tends to fall-back non-coherently (without rotation). However, by displacing the effective magnetic moment away from the hard axis in excess of 10° (preferably 20°), as by a control pulse applied to a separate winding, coherent fall-back occurs and rotation of the magnetic field takes place.

Referring to FIG. 1, there is shown an anisotropic thin magnetic film 10 upon a substrate 12. A pump source 14 is coupled to a pump winding 16. The pump winding 16 has its axis lying in the hard axis of the film. The pump source 14 includes a D.C. bias and an A.C. supply having a frequency $f_p$ superimposed on the D.C. bias. The D.C. bias is of sufficient magnitude to create a magnetic field $H_B$ which is greater than $H_k$, the field to be overcome to saturate the film in the hard direction. The peaks of the A.C. supply are equal to or greater than 2 $H_p$. A control winding 18, having its axis oriented approximately 40° from the hard axis receives suitable trigger pulses from a trigger source 20.

An output winding 22 has a capacitor 24 across its terminals, so that the resonance frequency of the output circuit with air inductance is $f_p/2$. A suitable load 26 is coupled across the capacitor 24. A small signal source 28 can be coupled by suitable means, as by a transformer 30 to the output tuned circuit 22–24.

Figure 2:
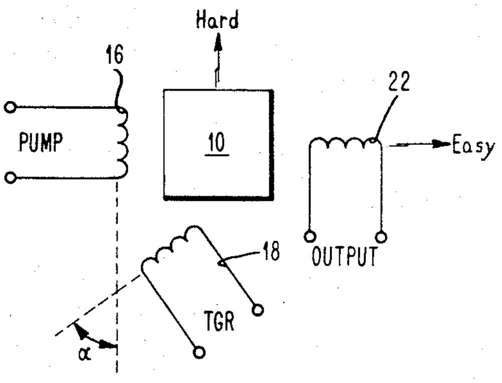
FIG. 2 is an exploded view of the circuitry shown in FIG. 1.

Referring to FIG. 2, there is shown an exploded view of the circuit shown in FIG. 1. The windings 16, 18, 22 have their axes in the plane of the film 10. The pump winding 16 is perpendicular to the output winding 22. The trigger winding 18 has its axis at an angle $\alpha$ (for example, 40°) from the axis of the pump winding.

The inductance of the output winding 22 is dependent upon the state of magnetization of the film. When the magnetic film 10 has its magnetic field aligned along its easy axis, and hence along the axis of the output winding 22, the inductance of the output winding is at a minimum, approaching air inductance. This minimum inductance $L_o$, together with the capacitor 24, is tuned to the frequency $f_o=f_p/2$. When the magnetization of the film 10 lies along the hard magnetic direction, the inductance of the output coil is at a maximum $L_{max}$, ($L_{max}=L_o+\Delta L$).

Figure 4:
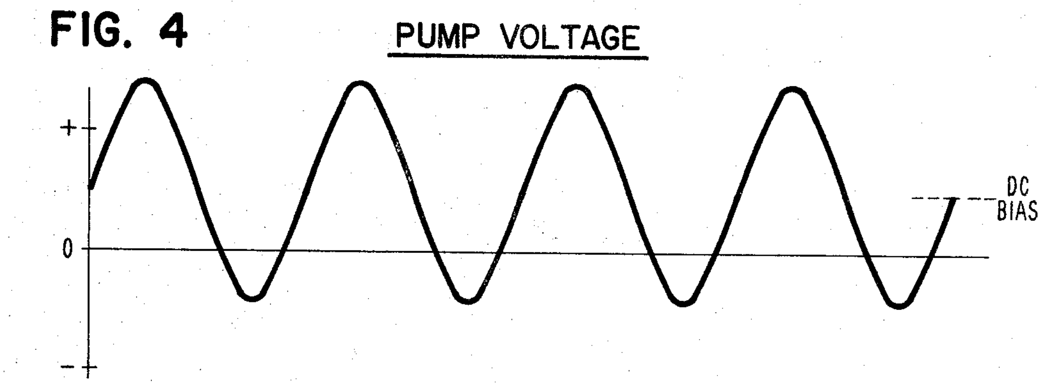
FIG. 4 is a waveform of the current produced by a pump source with relation to time, in accordance with one embodiment of this invention.
Figure 5:
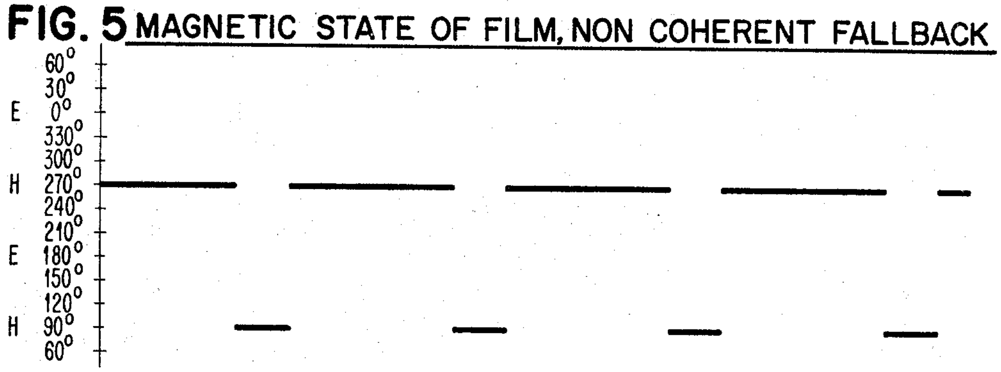
FIG. 5 is a waveform of the directions of magnetic states of a film wherein non-coherent fall-back occurs, the waveform being illustrated with the same time scale as FIG. 4.
Figure 7:
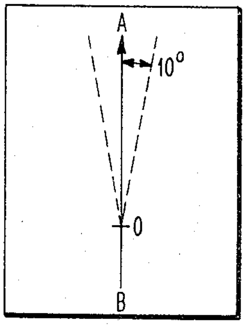
FIG. 7 is a Lissajous figure of FIG. 5.

As the pump source field varies sinusoidally about its D.C. bias the film 10 is driven alternately from saturation in one hard axis direction to its opposite hard axis direction. The locus of the direction of magnetic moment, during non-coherent fall-back, with respect to a reference 0, is a straight line A–B, shown in the Lissajous illustration of FIG. 7. Referring to FIG. 5, there is shown a drawing showing the direction of magnetization with respect to time, the time base being identical to the time base for FIG. 4.

When the pump signal is positive with respect to its bias source, the film stays saturated in its hard direction, illustrated in FIG. 5 as magnetized in a direction 270° from the easy axis. When the pump signal approaches its negative maximum, the film 10 becomes saturated in its opposite direction of magnetization in a direction 90° from the easy axis. As shown in FIG. 5, during the transition from saturation in one direction to saturation in the opposite direction, note that, at no time, during this mode of operation is there any component of magnetic moment in the easy axis of the film 10. This results in zero energy transfer from the pump field to the signal field.

As long as the remagnetization of the film proceeds by non-coherent rotation, no parametric excitation in the large signal mode is possible. If, however, the magnetic moment of the film be displaced from the hard axis in excess of a critical angle, reversal of the magnetic moment can take place by pure rotation or coherent fall-back. This critical angle has been found to vary between 5°–25° about the hard magnetic axis for various films that have been tested. The displacement of the magnetic moment could take place, theoretically, by applying a pulse in a winding whose axis is perpendicular to the hard axis. For some reason which is not readily explainable, optimum results take place when the axis of the winding is oriented at an angle $\alpha_{max}$ with respect to the hard axis. The angle $\alpha_{max}$ for various films is preferably about 40°.

A trigger pulse from the trigger source 20 flows through the trigger winding 18 and is of sufficient magnitude to displace the magnetic moment of the film from the hard axis by an angle in excess of the critical angle. The pump source 14, as it oscillates, causes the film 10 to reverse, but since the moment is displaced from the hard axis in excess of the critical angle, rotational or coherent fall-back takes place. Oscillations are induced in the output winding 22 as described hereinafter and regenerative feedback takes place. The effect of the oscillations in the output circuit and the pump source cause the directions of magnetization to follow the path illustrated in FIG. 6 and shown in the Lissajous illustration of FIG. 8.

Figure 6:
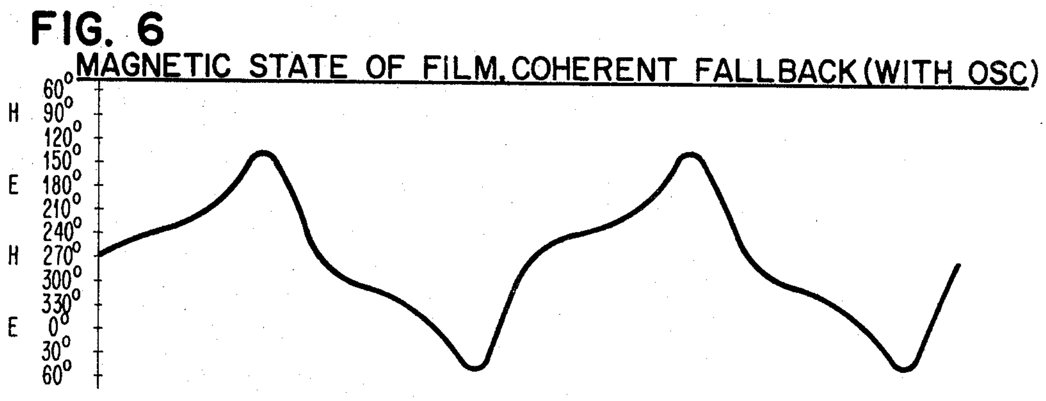
FIG. 6 is a waveform of the directions of magnetic states of a film wherein coherent fall-back occurs, the waveform being illustrated with the same time scale as FIG. 4.
Figure 8:
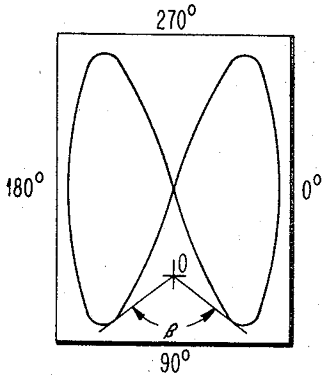
FIG. 8 is a Lissajous figure of FIG. 6.

During oscillation, the oscillations in the output circuit feedback to the film 10 and the pump signal combine to cause the directions of magnetization to follow the locus shown in the Lissajous figure shown in FIG. 8. The directions of magnetization follow the path shown in FIG. 6 with respect to time, the time axis being the same as shown for the pump source of FIG. 4. As shown in FIG. 6, the magnetization of the film 10 is oriented in its easy axis only once per cycle of the pump frequency. As stated heretofore, whenever the direction of magnetization lies in the easy axis, the output circuit is tuned to its "natural" frequency, $f_o$. The inductance of the output winding 22 varies between $L_{max}$ and $L_o$, due to rotational fall-back, thereby causing parametric oscillations to take place.

Figure 9:
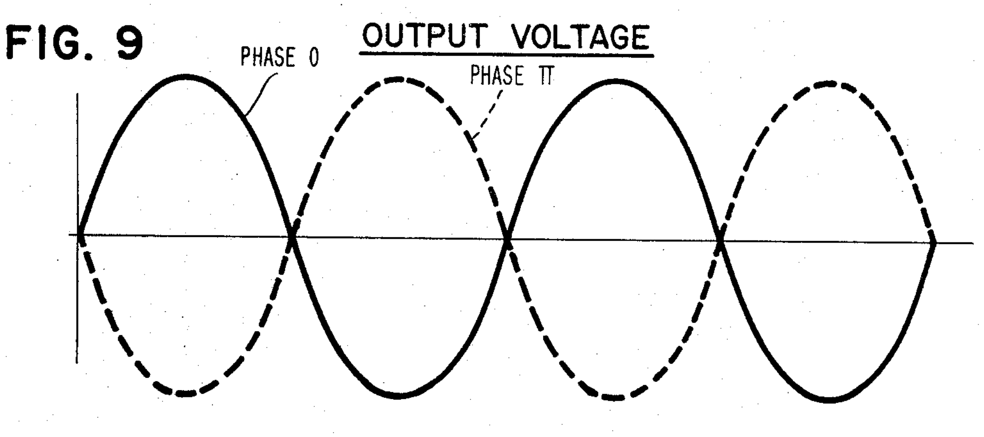
FIG. 9 is a waveform of the two different stable phase states possible in the output circuit, one phase being shown in solid lines, the other in dotted form.

The parametric oscillations can take place in one of two different phases, as shown in FIG. 9. The output voltage present across the load 26 can be either at phase 0 or phase $\pi$, and, once in phase, remains locked in phase unless otherwise changed as set forth hereinafter. As set forth heretofore, the desired phase is obtained by inducing a "locking" signal into the circuit at the desired phase. The phase of the signal $f_o$ from the source 28, though relatively small in amplitude, determines what the phase of the output signal will be.

Tests have shown that the pump frequency present in the output circuit is nil.

Oscillations take place in the output circuit in a stable manner. When it is desired to turn off the oscillations to place the device in its stable non-oscillating mode, a suitable trigger pulse is applied by the trigger pulse source 20 to the trigger winding 18. The trigger pulse causes the moment of magnetization to be oriented toward the hard direction within the non-oscillation angle $\beta$, shown in FIG. 8, and oscillation in the output circuit ceases. The film 10 switches from saturation in one hard direction to the other by non-coherent fall-back.

The device described has three stable states: non-oscillation, oscillation in phase 0, and oscillation in phase $\pi$. The circuit can be switched from non-oscillation to oscillation in phase 0 by applying a trigger pulse to the control winding 18 and a small signal at phase 0 to the output circuit. The circuit can be switched from non-oscillation to oscillation in phase $\pi$ by applying a trigger pulse to the control winding 18 together with a small signal of phase $\pi$ applied to the output circuit. The small signal supplied by the signal source 28 need not be continuous, but may be a temporary signal, the device will continue oscillating though the signal source 28 be removed. The circuit can be switched, as set forth above, from oscillation to non-oscillation by a suitable trigger pulse.

The circuit can be switched from one stable oscillating state to the other stable oscillating state by first applying the "turn-off" trigger pulse to the control winding 18 and subsequently applying a "turn-on" trigger pulse to the control winding 18 in coincidence with a small signal of the desired phase to the signal transformer 30. The "turn-on" pulse and the "turn-off" pulse are normally of opposite polarities.

The following is a typical example of one embodiment of this invention:

The film 10 is obtained by electroplating onto a substrate of glass in a solution of nickel-iron sulfate at room temperature, pH 2.2, $J$=6 ma./cm.[2], in a magnetic field of 30 oe.

The film is 1000 A. in thickness with an area of 3.14 cm.[2], $H_c$=2.5 oe. and $H_k$=4.5 oe.

The pump source 14 has a D.C. bias of 7 oersteds and a frequency of $10^8$ c.p.s. with a peak to peak field of 15 oersteds.

The pump winding 16 is 30 turns of No. 28 wire.

The trigger source 20 provides "turn-on" pulses of 0.5 oersted having a 3 m. sec. duration and "turn-off" pulses of 1 oersted having a 3 m. sec. duration.

The control winding 18 includes a cube coil developing 7 oe./amp.

The output winding 22 has 40 turns of No. 32 wire with an inductance of 5 $\mu$h. when the film is in its easy axis and 5.2 $\mu$h. when the film is in its hard axis.

The capacitor 24 is 2.1 $\mu\mu$f.

The signal 28 is $5\times10^{-3}$ volts at $5\times10^7$ c.p.s.

Other modifications and variations will become obvious to those skilled in the art. Ratios of $f_p/f_o$, other than 2, will be suggested to those skilled in the art. Magnetic films which are produced by various processes can be used.

What is claimed is:

1. In combination,
- an anisotropic thin magnetic film having an easy axis and a hard axis of magnetization,
- a first winding inductively coupled to said hard axis,
- a pump source coupled to said first winding,
- a second winding inductively coupled to said easy axis,
- an output means coupled to said second winding,
- a third winding inductively coupled to said film along an axis displaced from said hard axis, and means for applying control signals to said third winding to control the production of oscillations in said second winding.

2. The combination as claimed in claim 1 wherein said third winding is inductively coupled to said film along an axis displaced from said hard axis at an angle in excess of 10°.

3. In combination,
- an anisotropic thin magnetic film having an easy axis and a hard axis of magnetization,
- a first winding inductively coupled to said hard axis,
- a pump source coupled to said first winding,
- a second winding inductively coupled to said easy axis,
- a capacitor coupled across said second winding,
- a third winding inductively coupled to said film along an axis disposed from said hard axis by an angle in excess of 10°, and means for applying control signals to said third winding to control the production of oscillations in said second winding.

4. The combination as claimed in claim 3 wherein said angle is approximately 40°.

5. In combination,
- an anisotropic thin magnetic film having an easy axis and a hard axis of magnetization,
- means for receiving a pumping source having an alternating current voltage at a frequency $f_p$,
- a pump winding coupled to said receiving means and inductively coupled to said hard axis,
- means for receiving a control source,
- a control winding coupled to said control source receiving means, said winding being coupled to an axis in said film which lies at an angle in excess of 10° with respect to said hard axis,
- an output winding inductively coupled to said easy axis, said output winding when said film is magnetized in its easy direction having an inductance $L_o$, and
- a capacitor C coupled across said output winding, the values of $L_o$ and C being such as to be resonant at approximately $f_p/2$.

6. The combination as claimed in claim 5 including means for receiving a locking signal having a frequency $f_p/2$ and means for coupling said locking signal receiving means to said output winding.

7. In combination,
- an anisotropic thin magnetic film having an easy axis and a hard axis of magnetization,
- a pump winding inductively coupled to said hard axis,
- a direct current bias source coupled to said pump winding, said source being of sufficient magnitude to saturate said film in one direction along said hard axis,
- an alternating current pump source coupled to said pump winding, said pump source having a frequency $f_p$ and a peak voltage equal to at least twice said bias source whereby said film can alternately be saturated in opposite directions along its hard axis, the reversal of magnetic saturation normally occurring in a non-coherent manner,
- a control voltage source,
- a control winding coupled to said control voltage source and inductively coupled to said film at an angle with respect to said hard axis, said angle and said control voltage being of such values that a magnetic moment is created in said film temporarily to cause saturation in a direction displaced from said hard axis, whereby the reversal of saturation by said film takes place coherently,
- an output winding coupled inductively to said easy axis, said output winding having an inductance, when said film is saturated in said easy direction, of $L_o$, and
- a capacitor C coupled across said inductance, said $L_o$ and C forming a tuned circuit resonant at $f_p/2$.

8. The combination as claimed in claim 7 including means for coupling a locking signal at frequency $f_p/2$ to said output winding.

9. In combination,
- an anisotropic thin magnetic film having an easy axis and a hard axis of magnetization, an output winding inductively coupled to said easy axis, said output winding when said film is saturated in its easy direction having an inductance $L_o$, a capacitance C coupled to said output winding, the values of $L_0$ and C forming a tuned circuit resonant at a frequency $f_o$, means to alternately saturate said film in both directions along said hard axis at a frequency of $2f_o$, whereby non-coherent fall-back occurs, and means to cause said film to reverse its magnetic state coherently whereby parametric oscillations are induced in said output winding.

References Cited

UNITED STATES PATENTS

| | | | |
|---|---|---|---|
| 3,123,717 | 3/1964 | Hewitt et al. | 307—88 |
| 3,193,694 | 7/1965 | Ehresman et al. | 307—88 |
| 3,066,283 | 11/1962 | Davis | 340—174 X |
| 3,070,783 | 12/1962 | Pohm | 340—174 |

FOREIGN PATENTS

| | | |
|---|---|---|
| 1,260,458 | 3/1961 | France. |

STANLEY M. URYNOWICZ, Jr., *Primary Examiner.*